US012786841B2

(12) United States Patent
Cohen et al.

(10) Patent No.: US 12,786,841 B2
(45) Date of Patent: Nov. 3, 2026

(54) HYBRID PHASED ANTENNA ARRAY FOR DEVICE TRACKING

(71) Applicant: Infinitus Holdings Inc., Penn Valley, PA (US)

(72) Inventors: Joshua Ian Cohen, Penn Valley, PA (US); John Cronin, Jericho, VT (US)

(73) Assignee: Infinitus Holdings Inc., Penn Valley, PA (US)

( * ) Notice: Subject to any disclaimer, the term of this patent is extended or adjusted under 35 U.S.C. 154(b) by 165 days.

(21) Appl. No.: 18/808,382

(22) Filed: Aug. 19, 2024

(65) Prior Publication Data

US 2026/0052450 A1 Feb. 19, 2026

(51) Int. Cl.

*H04W 40/20* (2009.01)
*G01S 5/14* (2006.01)
*H04W 64/00* (2009.01)

(52) U.S. Cl.

CPC ............... *H04W 40/20* (2013.01); *G01S 5/14* (2013.01); *H04W 64/003* (2013.01)

(58) Field of Classification Search

None
See application file for complete search history.

(56) References Cited

U.S. PATENT DOCUMENTS

| | | | |
|---|---|---|---|
| 5,539,413 | A | 7/1996 | Farrell et al. |
| 6,047,192 | A | 4/2000 | Maloney et al. |
| 6,307,475 | B1 | 10/2001 | Kelley |
| 6,691,947 | B2 | 2/2004 | La Fata |
| 8,085,199 | B2 | 12/2011 | Grau Besoli et al. |
| 8,421,615 | B2 | 4/2013 | Ryu et al. |

(Continued)

FOREIGN PATENT DOCUMENTS

| | | |
|---|---|---|
| BR | 112019019353 | 4/2020 |
| CA | 3056593 | 9/2018 |

(Continued)

OTHER PUBLICATIONS

Barbera et al., "Signals from the crowd: uncovering social relationships through smartphone probes," Proceedings of the 2013 Conference on Internet Measurement Conference, IMC '13, Jan. 1, 2013, pp. 265-276.

(Continued)

*Primary Examiner* — Angela Nguyen
(74) *Attorney, Agent, or Firm* — Polsinelli LLP

(57) ABSTRACT

A hybrid phased array device with a standard wireless router system for a dual reception of standard Wi-Fi, Bluetooth, cellular, or other type of wireless base station and high-density device management and accurate signal tracking. The system comprises a standard wireless router with its antenna and electronics and a phased array device with a phased antenna array. One or more user devices connect to the wireless router and/or phased array device via a network interface card (NIC). A phased array signal processing module processes the signal from the phased antenna array to calculate the location of the user devices. An interface port connects the standard wireless router and the phased array device. An interface module facilitates compatibility between the wireless router and the phased array device. The phased array device may utilize both passive and active detection of user devices.

21 Claims, 3 Drawing Sheets

(56) References Cited

U.S. PATENT DOCUMENTS

| | | | |
|---|---|---|---|
| 8,725,777 | B2 | 5/2014 | Deking et al. |
| 8,989,053 | B1 | 3/2015 | Skaaksrud et al. |
| 9,641,964 | B2 | 5/2017 | Kulkarni et al. |
| 9,739,878 | B2 | 8/2017 | Gudim et al. |
| 9,900,742 | B1 | 2/2018 | Thoresen et al. |
| 9,904,509 | B1 | 2/2018 | Raffa et al. |
| 9,936,442 | B1 | 4/2018 | Noonan et al. |
| 9,989,633 | B1 | 6/2018 | Pandey et al. |
| 10,085,118 | B1 | 9/2018 | Thoresen et al. |
| 10,341,814 | B2 | 7/2019 | Thoresen et al. |
| 10,470,675 | B2 | 11/2019 | Zhang et al. |
| 10,587,987 | B2 | 3/2020 | Thoresen et al. |
| 10,721,590 | B2 | 7/2020 | Thoresen et al. |
| 10,969,486 | B2 | 4/2021 | Thoresen et al. |
| 11,455,411 | B2 | 9/2022 | Alameh et al. |
| 11,573,317 | B2 | 2/2023 | Thoresen et al. |
| 11,861,546 | B1 | 1/2024 | Wang et al. |
| 12,159,256 | B1 | 12/2024 | Zeng et al. |
| 12,198,698 | B1 | 1/2025 | Benster et al. |
| 12,412,465 | B1 | 9/2025 | Daoura et al. |
| 12,442,915 | B1 | 10/2025 | Cohen et al. |
| 12,498,447 | B1 | 12/2025 | Wichgers |
| 2002/0008657 | A1 | 1/2002 | Poore |
| 2002/0019829 | A1 | 2/2002 | Shapiro |
| 2002/0111173 | A1 | 8/2002 | Hendrey et al. |
| 2002/0164995 | A1 | 11/2002 | Brown et al. |
| 2002/0183072 | A1 | 12/2002 | Steinbach et al. |
| 2003/0003933 | A1 | 1/2003 | Deshpande et al. |
| 2003/0020623 | A1 | 1/2003 | Cao et al. |
| 2003/0048224 | A1 | 3/2003 | Benner et al. |
| 2003/0054813 | A1 | 3/2003 | Riley et al. |
| 2003/0083046 | A1 | 5/2003 | Mathis |
| 2003/0096621 | A1 | 5/2003 | Jana et al. |
| 2003/0096628 | A1 | 5/2003 | Bar-On et al. |
| 2003/0100326 | A1 | 5/2003 | Grube et al. |
| 2003/0186716 | A1 | 10/2003 | Dorenbosch et al. |
| 2004/0111184 | A1 | 6/2004 | Chiappetta et al. |
| 2004/0235568 | A1 | 11/2004 | Kim |
| 2005/0020279 | A1 | 1/2005 | Markhovsky et al. |
| 2005/0113123 | A1 | 5/2005 | Torvinen |
| 2005/0149443 | A1 | 7/2005 | Torvinen |
| 2005/0210104 | A1 | 9/2005 | Torvinen |
| 2005/0221812 | A9 | 10/2005 | Gailey et al. |
| 2005/0233776 | A1 | 10/2005 | Allen et al. |
| 2007/0081503 | A1 | 4/2007 | Mower |
| 2007/0127634 | A1 | 6/2007 | Katsumi |
| 2008/0062049 | A1 | 3/2008 | Soler Castany et al. |
| 2009/0167787 | A1 | 7/2009 | Bathiche et al. |
| 2009/0201850 | A1 | 8/2009 | Davis et al. |
| 2010/0134254 | A1 | 6/2010 | Kim |
| 2010/0287485 | A1 | 11/2010 | Bertolami et al. |
| 2011/0125063 | A1 | 5/2011 | Shalon et al. |
| 2011/0183683 | A1 | 7/2011 | Das et al. |
| 2011/0257812 | A1 | 10/2011 | Carpenter et al. |
| 2011/0273321 | A1 | 11/2011 | Joshi et al. |
| 2012/0307645 | A1 | 12/2012 | Grosman et al. |
| 2013/0044128 | A1 | 2/2013 | Liu et al. |
| 2013/0099898 | A1 | 4/2013 | Bloy |
| 2013/0142384 | A1 | 6/2013 | Ofek |
| 2013/0222371 | A1 | 8/2013 | Reitan |
| 2013/0231130 | A1 | 9/2013 | Cherian et al. |
| 2013/0278464 | A1 | 10/2013 | Xia et al. |
| 2013/0342564 | A1 | 12/2013 | Kinnebrew et al. |
| 2014/0018059 | A1 | 1/2014 | Noonan |
| 2014/0231499 | A1 | 8/2014 | Simmons, Jr. |
| 2014/0266619 | A1 | 9/2014 | Ali et al. |
| 2014/0285375 | A1 | 9/2014 | Crain |
| 2015/0062558 | A1 | 3/2015 | Koppal et al. |
| 2015/0116144 | A1 | 4/2015 | Olmedo et al. |
| 2015/0147067 | A1 | 5/2015 | Ryan et al. |
| 2015/0221135 | A1 | 8/2015 | Hill et al. |
| 2015/0241959 | A1 | 8/2015 | Abovitz et al. |
| 2015/0287422 | A1 | 10/2015 | Short et al. |
| 2015/0302665 | A1 | 10/2015 | Miller |
| 2015/0319568 | A1 | 11/2015 | Haro et al. |
| 2015/0319687 | A1 | 11/2015 | Farley et al. |
| 2015/0334768 | A1 | 11/2015 | Ranasinghe et al. |
| 2015/0348538 | A1 | 12/2015 | Donaldson |
| 2015/0356782 | A1 | 12/2015 | Miller et al. |
| 2015/0382148 | A1 | 12/2015 | Agarwal et al. |
| 2016/0050525 | A1 | 2/2016 | Droll et al. |
| 2016/0117688 | A1 | 4/2016 | Ghosh et al. |
| 2016/0161607 | A1 | 6/2016 | Turner et al. |
| 2016/0189416 | A1 | 6/2016 | Naguib et al. |
| 2016/0292744 | A1 | 10/2016 | Strimaitis et al. |
| 2017/0006430 | A1 | 1/2017 | Chao et al. |
| 2017/0026805 | A1 | 1/2017 | Smith et al. |
| 2017/0089739 | A1 | 3/2017 | Gallo et al. |
| 2017/0188066 | A1 | 6/2017 | Gaidar et al. |
| 2017/0238136 | A1 | 8/2017 | Smith |
| 2017/0251400 | A1 | 8/2017 | Jha et al. |
| 2017/0301200 | A1 | 10/2017 | Siminoff |
| 2017/0336220 | A1 | 11/2017 | Broaddus et al. |
| 2017/0337813 | A1 | 11/2017 | Taylor |
| 2018/0091940 | A1 | 3/2018 | Gonzalez et al. |
| 2018/0123257 | A1 | 5/2018 | Henry et al. |
| 2018/0172824 | A1 | 6/2018 | Beckett et al. |
| 2018/0173494 | A1 | 6/2018 | Choi et al. |
| 2018/0253681 | A1 | 9/2018 | Stiefel et al. |
| 2018/0270608 | A1 | 9/2018 | Thoresen et al. |
| 2018/0270612 | A1 | 9/2018 | Thoresen et al. |
| 2018/0365898 | A1 | 12/2018 | Costa |
| 2019/0034673 | A1 | 1/2019 | Koch et al. |
| 2019/0043259 | A1 | 2/2019 | Wang et al. |
| 2019/0079176 | A1 | 3/2019 | Weissman |
| 2019/0132685 | A1 | 5/2019 | Skoglund et al. |
| 2019/0173156 | A1 | 6/2019 | Hu |
| 2019/0182627 | A1 | 6/2019 | Thoresen et al. |
| 2019/0195998 | A1 | 6/2019 | Campbell |
| 2020/0025911 | A1 | 1/2020 | Rappaport |
| 2020/0074386 | A1 | 3/2020 | Mossoba et al. |
| 2020/0074743 | A1 | 3/2020 | Zheng et al. |
| 2020/0118290 | A1 | 4/2020 | Liu et al. |
| 2020/0137516 | A1 | 4/2020 | Thoresen et al. |
| 2020/0200892 | A1 | 6/2020 | Rajab et al. |
| 2020/0201513 | A1 | 6/2020 | Malmed et al. |
| 2020/0204375 | A1 | 6/2020 | Coulmeau et al. |
| 2020/0279279 | A1 | 9/2020 | Chaudhuri |
| 2020/0309944 | A1 | 10/2020 | Thoresen et al. |
| 2020/0372442 | A1 | 11/2020 | Tennill et al. |
| 2021/0104154 | A1 | 4/2021 | Yokoyama et al. |
| 2021/0142055 | A1 | 5/2021 | Broggi |
| 2021/0215818 | A1 | 7/2021 | Kim et al. |
| 2021/0223389 | A1 | 7/2021 | Ikefuji et al. |
| 2021/0271949 | A1 | 9/2021 | Forster |
| 2021/0318428 | A1 | 10/2021 | Thoresen et al. |
| 2021/0374485 | A1 | 12/2021 | Pilcher et al. |
| 2021/0391917 | A1 * | 12/2021 | Morozs .............. H04B 7/18504 |
| 2021/0405182 | A1 | 12/2021 | Reynolds et al. |
| 2022/0044681 | A1 | 2/2022 | Agarwal |
| 2022/0078578 | A1 | 3/2022 | Brumley et al. |
| 2022/0084066 | A1 | 3/2022 | Kisko et al. |
| 2022/0091259 | A1 | 3/2022 | Hucks et al. |
| 2022/0094036 | A1 | 3/2022 | Yong et al. |
| 2022/0107387 | A1 | 4/2022 | Chayat et al. |
| 2022/0196782 | A1 | 6/2022 | Dawar et al. |
| 2022/0256310 | A1 | 8/2022 | Volkerink et al. |
| 2022/0284883 | A1 | 9/2022 | Buchter et al. |
| 2022/0311112 | A1 | 9/2022 | Wang et al. |
| 2022/0375477 | A1 | 11/2022 | Tan et al. |
| 2023/0056831 | A1 | 2/2023 | Manolakos et al. |
| 2023/0128484 | A1 | 4/2023 | Turbiner et al. |
| 2023/0189024 | A1 | 6/2023 | Tran et al. |
| 2023/0258763 | A1 | 8/2023 | Donderici |
| 2023/0259798 | A1 | 8/2023 | Modugula et al. |
| 2023/0290342 | A1 | 9/2023 | Kim et al. |
| 2023/0298462 | A1 | 9/2023 | Witt |
| 2023/0319699 | A1 | 10/2023 | Kiss et al. |
| 2023/0334850 | A1 | 10/2023 | Harvey et al. |
| 2023/0353450 | A1 | 11/2023 | Wang |
| 2023/0360389 | A1 | 11/2023 | Tiballi |
| 2023/0408627 | A1 * | 12/2023 | Bao ........................ G01S 5/0236 |
| 2024/0022565 | A1 | 1/2024 | Keith, Jr. |
| 2024/0188109 | A1 | 6/2024 | Bao et al. |

(56) References Cited

U.S. PATENT DOCUMENTS

| | | | |
|---|---|---|---|
| 2024/0204878 A1* | 6/2024 | Howe .................... | H04B 10/54 |
| 2024/0214452 A1 | 6/2024 | Skaaksrud | |
| 2024/0220543 A1 | 7/2024 | Blake et al. | |
| 2025/0094380 A1 | 3/2025 | Mazed | |
| 2025/0111845 A1 | 4/2025 | Thiruchengode Vajravel et al. | |
| 2025/0142289 A1 | 5/2025 | Seo et al. | |
| 2025/0180369 A1 | 6/2025 | Gurgul et al. | |
| 2025/0190723 A1 | 6/2025 | Reddy et al. | |
| 2025/0299157 A1 | 9/2025 | Hiscock et al. | |
| 2025/0349040 A1 | 11/2025 | Aberman et al. | |
| 2025/0392884 A1 | 12/2025 | Austin et al. | |
| 2026/0039016 A1 | 2/2026 | Duron et al. | |
| 2026/0050078 A1 | 2/2026 | Cohen et al. | |
| 2026/0056703 A1 | 2/2026 | Ramasamy et al. | |
| 2026/0073426 A1 | 3/2026 | Cohen et al. | |
| 2026/0073639 A1 | 3/2026 | Cohen et al. | |
| 2026/0073925 A1 | 3/2026 | Cohen et al. | |
| 2026/0080351 A1 | 3/2026 | Cohen et al. | |
| 2026/0080896 A1 | 3/2026 | Cohen et al. | |
| 2026/0086228 A1 | 3/2026 | Cohen et al. | |
| 2026/0086229 A1 | 3/2026 | Cohen et al. | |
| 2026/0087522 A1 | 3/2026 | Cohen et al. | |
| 2026/0181575 A1 | 6/2026 | Cohen et al. | |
| 2026/0243886 A1 | 8/2026 | Cohen et al. | |

FOREIGN PATENT DOCUMENTS

| | | |
|---|---|---|
| CN | 102473266 A | 5/2012 |
| CN | 103166691 A | 6/2013 |
| CN | 104380279 A | 2/2015 |
| CN | 104569964 | 4/2015 |
| CN | 110390944 A | 10/2019 |
| CN | 110637480 | 12/2019 |
| CN | 112788288 A | 5/2021 |
| CN | 213818098 U | 7/2021 |
| CN | 114487804 A | 5/2022 |
| CN | 115622626 A | 1/2023 |
| CN | 116959455 A | 10/2023 |
| EP | 3596977 | 1/2020 |
| IL | 269372 A | 11/2019 |
| JP | 2017-067624 | 4/2017 |
| JP | 2020-515205 | 5/2020 |
| WO | WO 2012/082155 A2 | 6/2012 |
| WO | WO 2016/109455 | 7/2016 |
| WO | WO 2018/169558 | 9/2018 |
| WO | WO 2019/089201 | 5/2019 |
| WO | WO 2019/113418 | 6/2019 |
| WO | WO 2019/210284 | 10/2019 |
| WO | 2024045166 A1 | 3/2024 |
| WO | PCT/US25/41389 | 8/2025 |
| WO | PCT/US25/42467 | 8/2025 |
| WO | PCT/US25/42470 | 8/2025 |
| WO | PCT/US25/43788 | 8/2025 |
| WO | PCT/US25/45237 | 9/2025 |
| WO | PCT/US25/45239 | 9/2025 |
| WO | PCT/US25/45240 | 9/2025 |
| WO | PCT/US25/46455 | 9/2025 |
| WO | PCT/US25/47258 | 9/2025 |
| WO | PCT/US25/47341 | 9/2025 |
| WO | PCT/US25/47602 | 9/2025 |
| WO | PCT/US25/48302 | 9/2025 |
| WO | 2026036114 A1 | 2/2026 |
| WO | WO 2026/043820 A2 | 2/2026 |
| WO | WO 2026/043822 A1 | 2/2026 |
| WO | WO 2026/050412 A1 | 3/2026 |
| WO | WO 2026/055553 A1 | 3/2026 |
| WO | WO 2026/055555 A1 | 3/2026 |
| WO | WO 2026/055556 A1 | 3/2026 |
| WO | WO 2026/060404 A1 | 3/2026 |
| WO | WO 2026/064678 A1 | 3/2026 |
| WO | WO 2026/064706 A1 | 3/2026 |
| WO | WO 2026/072596 A2 | 4/2026 |
| WO | WO 2026/073038 A1 | 4/2026 |

OTHER PUBLICATIONS

Pang et al., "802.11 user fingerprinting," Proceedings of the 13th Annual ACM International Conference on Mobile Computing and Networking, ACM, Montreal, Quebec, Canada, Sep. 9, 2007, pp. 99-110.
Scheuner et al., "Probr—A Generic and Passive WiFi Tracking System" 2016 IEEE 41st Conference on Local Computer Networks.
EP Application No. 2017901233.7, Extended European Search Report dated Jul. 31, 2020.
Israeli Application No. 269372, Office Action dated Jul. 27, 2021.
Mexican Application No. MX/a/2019/010955, Second Office Action dated Jun. 27, 2022.
Mexican Application No. MX/a/2019/010955, First Office Action dated Jan. 12, 2022.
PCT Application No. PCT/US2018/064420, International Search Report and Written Opinion dated Mar. 1, 2019.
PCT Application No. PCT/US2018/064420, International Preliminary Report on Patentability dated Jun. 18, 2020.
PCT Application No. PCT/US2017/033428, International Search Report and Written Opinion dated Aug. 1, 2017.
PCT Application No. PCT/US2017/033428, International Preliminary Report on Patentability dated Sep. 26, 2019.
PCT Application No. PCT/US2018/055157, International Search Report and Written Opinion dated Dec. 20, 2018.
PCT Application No. PCT/US2018/055157, International Preliminary Report on Patentability dated May 14, 2020.
PCT Application No. PCT/US2019/029507, International Search Report and Written Opinion dated Jul. 2, 2019.
PCT Application No. PCT/US2019/029507, International Preliminary Report on Patentability dated Nov. 5, 2020.
U.S. Appl. No. 15/802,399, Office Action dated Aug. 30, 2018.
U.S. Appl. No. 16/437,299, Office Action dated Feb. 5, 2020.
U.S. Appl. No. 17/222,928, Office Action dated Sep. 29, 2022.
U.S. Appl. No. 18/799,909, Joshua Ian Cohen, Graphene-Based Phased Array Antenna for Device Tracking, filed Aug. 9, 2024.
U.S. Appl. No. 18/808,970, Joshua Ian Cohen, Metamaterial Asset Tags for Device Tracking in a 3D Space, filed Aug. 19, 2024.
U.S. Appl. No. 18/827,531, Joshua Ian Cohen, Voice Identification via Radio Wave Demodulation, filed Sep. 6, 2024.
U.S. Appl. No. 18/817,639, Joshua Ian Cohen, Method and System for Determining Device Orientation Within Augmented Reality Applications, filed Aug. 28, 2024.
U.S. Appl. No. 18/826,822, Joshua Ian Cohen, Systems and Methods for Marker Placement in Augmented Reality, filed Sep. 6, 2024.
U.S. Appl. No. 18/826,846, Joshua Ian Cohen, Camera-Integrated Wireless 3D Mapping and Tracking System, filed Sep. 6, 2024.
U.S. Appl. No. 18/886,872, Joshua Ian Cohen, Augmented Reality Package Drop Point System, filed Sep. 16, 2024.
U.S. Appl. No. 18/891,448, Joshua Ian Cohen, Dynamic User-Tracking Digital Signage System and Method, filed Sep. 20, 2024.
U.S. Appl. No. 18/890,430, Joshua Ian Cohen, Wireless Device Fingerprinting Systems and Methods, filed Sep. 19, 2024.
U.S. Appl. No. 18/897,590, Joshua Ian Cohen, High-Edge Antennas for Optimized SAR Performance, filed Sep. 26, 2024.
U.S. Appl. No. 18/895,234, Joshua Ian Cohen, Wireless Base Station Deployment for Target Mapping, filed Sep. 24, 2024.
Chen et al., "THz Beamforming Using Graphene-Based Devices," Mar. 28, 2013, Retrieved from online Oct. 10, 2025, Retrieved from URL: https://ieeexplore.ieee.org/abstract/document/6486639.
Wang et al., "UWHear: Through-wall Extraction and Separation of Audio Vibrations Using Wireless Signals," Sensys '20: Proceedings of the 18th Conference on Embedded Networked Sensor Systems, Nov. 16, 2020, 14 pages. Retrieved on Nov. 3, 2025, URL: https://doi.org/10.1145/3384419.3430772.
U.S. Appl. No. 18/891,448, Office Action dated Aug. 27, 2025.
PCT Application No. PCT/US2025/041389, International Search Report and Written Opinion dated Oct. 20, 2025.
PCT Application No. PCT/US2025/042470, International Search Report and Written Opinion dated Nov. 4, 2025.
PCT Application No. PCT/US2025/045237, International Search Report and Written Opinion dated Nov. 20, 2025.

(56) References Cited

OTHER PUBLICATIONS

PCT Application No. PCT/US2025/043788, International Search Report and Written Opinion dated Oct. 21, 2025.
PCT Application No. PCT/US2025/045239, International Search Report and Written Opinion dated Nov. 20, 2025.
PCT Application No. PCT/US2025/045240, International Search Report and Written Opinion dated Nov. 25, 2025.
PCT Application No. PCT/US2025/046455, International Search Report and Written Opinion dated Jan. 9, 2026.
PCT Application No. PCT/US2025/047341, International Search Report and Written Opinion dated Nov. 18, 2025.
PCT Application No. PCT/US2025/047258, International Search Report and Written Opinion dated Dec. 3, 2025.
PCT Application No. PCT/US2025/048302, International Search Report and Written Opinion dated Dec. 11, 2025.
Apple: "iPhone 14 Pro—Technical Specifications," 2022, Downloaded on May 29, 2026. URL: https://support.apple.com/en-US/111850, 17 pages.
Huang, B. et al., "Cloud removal from optical satellite imagery with SAR imagery using sparse representation," IEEE Geoscience and Remote Sensing Letters, 12.5 (2015): 1046-1050. (Year: 2015).
Pourshamsi, M. et al., "A machine-learning approach to PolInSAR and LiDAR data for improved tropical forest canopy height estimation using NASA AfriSAR Campaign data," IEEE Journal of Selected Topics in Applied Earth Observations and Remote Sensing, 11.10 (2018): 3453-3463. (Year: 2018).
Rowland, S. L., "Understanding Our Digital Fingerprints: Metadata, Competency, and the Future Practice of Law," University of St. Thomas Law Journal, vol. 20, No. 1, pp. 276-294.
Sandberg, M., "Land cover mapping with multi-temporal SAR and optical satellite data," (2016) (Year: 2016).
Ying, Z., "Antennas in Cellular Phones for Mobile Communications," Proceedings of the IEEE, vol. 100, No. 7, Mar. 16, 2012, 11 pages.
U.S. Appl. No. 18/799,909, Office Action dated Jun. 30, 2026.
U.S. Appl. No. 19/355,976, Office Action dated Jun. 2, 2026.
U.S. Appl. No. 18/826,846, Office Action dated May 28, 2026.
U.S. Appl. No. 18/891,448, Office Action dated Jun. 12, 2026.
U.S. Appl. No. 18/890,430, Office Action dated Jun. 3, 2026.
U.S. Appl. No. 18/897,590, Office Action dated Jul. 28, 2026.
Park et al., "Autoencoder-based signal modulation and demodulation methods for sonobuoy signal transmission and reception," Sensors, vol. 22, No. 6510, Aug. 29, 2022, 15 pages.
U.S. Appl. No. 18/827,531, Office Action dated Apr. 22, 2026.
U.S. Appl. No. 18/826,822, Office Action dated Mar. 18, 2026.
U.S. Appl. No. 18/891,448, Final Office Action dated Mar. 2, 2026.

* cited by examiner

HYBRID PHASED ANTENNA ARRAY FOR DEVICE TRACKING

FIELD OF THE DISCLOSURE

The present disclosure is generally related to device tracking and more specifically to systems and methods for device tracking using a hybrid phased antenna array.

BACKGROUND

With the proliferation of wireless devices, especially those accessible via one or more networks, it has become desirable to be able to locate and identify such devices for a variety of purposes. However, standard wireless routers do not have the tools to track these devices in three dimensions with a high degree of accuracy.

Specialized tracking hardware can track wireless devices with a high degree of accuracy but is often expensive and may require reconfiguration of existing network infrastructure. Businesses and other entities may already have a system of costly wireless routers that they are not eager to fully replace and yet desire to track a number of wireless devices with precision, which is not possible using conventional approaches.

SUMMARY

Disclosed herein are systems and methods for device tracking using a hybrid phased antenna array that solve the problems and disadvantages of conventional approaches. According to one aspect, a system includes a wireless router configured to route data between a plurality of wireless devices and at least one packet switched network or subnetwork, the wireless router including a motherboard with an interface port. The system also includes a phased array device for wireless device tracking including a phased antenna array and a daughterboard operably connected to the phased antenna array and configured to be physically connected to the interface port of the wireless router. The daughterboard includes at least one processor and a memory. The memory includes at least one of a passive module configured to passively receive wireless signal data via the phased antenna array from at least a first subset of the plurality of wireless devices and/or an active module configured to actively receive the wireless signal data via the phased antenna array from at least a second subset of the plurality of wireless devices in response to at least one wireless signal being sent via the phased antenna array to the plurality of wireless devices. The system also includes a signal processing module configured to triangulate a location of each wireless device within an environment by calculating an angle from which wireless signals from the plurality of wireless devices arrive based on relative phase shifts caused by different paths the wireless signals take to reach the phased antenna array. The system simultaneously triangulates the location of each wireless device in the environment while routing the data between the plurality of wireless devices and the at least one packet switched network or subnetwork.

In some configurations, wherein the signal processing module is further configured trilaterate a location of each wireless device within an environment, and the system simultaneously triangulates and trilaterates the location of each wireless device in the environment while routing the data between the plurality of wireless devices and the at least one packet switched network or subnetwork.

In certain configurations, the phased antenna array collaborates operations with the wireless router configured using an integration module. The signal processing module is further configured to use at least one of a Kalman filter and Joint Probabilistic Data Association (JPDA) to estimate wireless device locations.

In various embodiments, the phased array device is configured to send the location of one or more of the plurality of wireless devices to a user device via the wireless router.

In some implementations, the memory further includes an interface module configured to control data flow between the phased array device and the wireless router via the interface port.

In some examples, the active module is configured to poll at least a subset of the plurality of wireless devices. The signal processing module is configured to integrate the wireless signal data from the active module and the passive module for the at least the first subset of the plurality of wireless devices and the at least the second subset of the plurality of wireless devices, respectively.

The signal processing module is configured to integrate the wireless signal data by performing at least one of aligning timestamps, normalizing signal strengths, and correcting for discrepancies between datasets.

According to another aspect, a method includes providing a wireless router configured to route data between a plurality of wireless devices and at least one packet switched network or subnetwork, the wireless router including a motherboard with an interface port. The method also includes providing a phased array device for wireless device tracking including a phased antenna array and a daughterboard including at least one processor and a memory. The method further includes operably connecting the daughterboard to the interface port of the wireless router. In addition, the method includes receiving, via the phased antenna array, wireless signal data from at least a subset of the plurality of wireless devices. The method also includes triangulating a location of each wireless device within an environment by calculating an angle from which wireless signals from the plurality of wireless devices arrive based on relative phase shifts caused by different paths the wireless signals take to reach the phased antenna array. The method additionally includes simultaneously with triangulating the location of each wireless device, routing the data between the plurality of wireless devices and the at least one packet switched network or subnetwork.

In some configurations, the method includes physically connecting together the wireless router and the phased array device within a common housing.

In various configurations, the method includes, simultaneously with triangulating the location of each wireless device, trilaterating the location of each wireless device within the environment.

In certain implementations, wherein the phased antenna array collaborates operations with the wireless router configured using an integration module.

In some examples, the method further includes performing at least one of a Kalman filtering and Joint Probabilistic Data Association (JPDA) to estimate wireless device locations.

In various configurations, the phased array device is configured to send locations of one or more of the plurality of wireless devices to a user device via the wireless router.

In some implementations, the method includes receiving the wireless signal data from the at least the subset of the plurality of wireless devices includes at least one of passively receiving the wireless signal data from at least a first subset of the plurality of wireless devices and/or actively receiving the wireless signal data from at least a second subset of the plurality of wireless devices in response to transmitting, via the phased antenna array, at least one signal to the plurality of wireless devices.

In certain examples, actively receiving comprises polling the at least the second subset of the plurality of wireless devices.

In various configurations, triangulating includes integrating signal data passively or actively received form the at least the first subset of the plurality of wireless devices and the at least the second subset of the plurality of wireless devices, respectively.

In some examples, integrating includes at least one of aligning timestamps, normalizing signal strengths, and correcting for discrepancies between datasets.

DETAILED DESCRIPTION

Embodiments of the present disclosure will be described more fully hereinafter with reference to the accompanying drawings in which like numerals represent like elements throughout the several figures. Aspects of the disclosed systems and methods may be embodied in many different forms and should not be construed as limited to the embodiments set forth herein. The examples set forth herein are non-limiting and are merely some among many possible examples.

Figure 1:
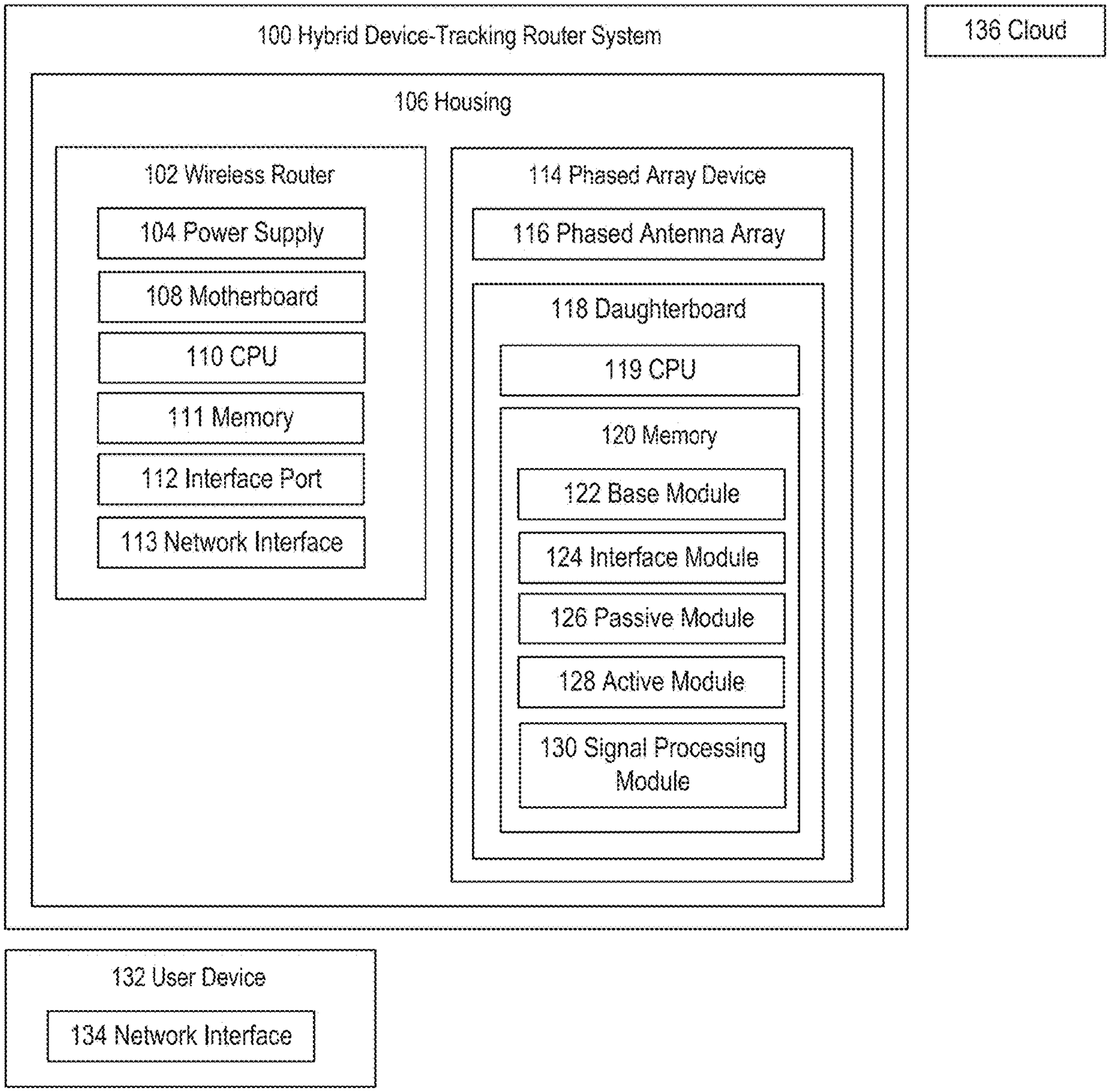
FIG. 1 is a schematic diagram of a phased array tracking system according to an embodiment.

FIG. 1 is a schematic diagram of a hybrid device-tracking router system 100 (or simply system 100). The system 100 may include a wireless router 102, which may be a device that performs the functions of a standard router and may also include the functions of a wireless access point. The wireless router 102 may route data between a plurality of wireless devices (or a subset thereof) and at least one packet switched network or subnetwork. This configuration allows the wireless router 102 to not only route data between different networks but also to connect wireless devices to these networks, thus providing a bridge between wired and wireless communications. In some embodiments, the wireless router 102 is used to provide access to a cloud or a private computer network. Access to the cloud may enable users to utilize various cloud-based services, including storage, computing power, and applications hosted on remote servers. Alternatively, access to a private computer network allows secure communication within an organization or a home network.

Depending on the manufacturer and model, the wireless router 102 may function in a wired local area network (LAN), in a wireless-only LAN, or in a mixed wired and wireless network. This versatility allows it to accommodate different network configurations and user needs. In a wired LAN, certain devices are connected to the router via Ethernet cables, whereas in a wireless-only LAN, devices connect to the wireless router 102 using Wi-Fi. In a mixed network, the wireless router 102 can manage both wired and wireless connections simultaneously. The wireless router 102 may also be a type of wireless base station that allows for a Bluetooth, cellular, or other type of signal frequency connection or broadcast. In one embodiment, the wireless router 102 may be configured for military grade synthetic aperture radar signals.

The wireless router 102 may include a power supply 104, which may provide power to the wireless router 102 and other components of the system 100. The power supply 104 may be a component or external adapter that provides the necessary electrical power to operate the wireless router 102. The power supply 104 may convert the alternating current (AC) from a wall outlet into the direct current (DC) used by the wireless router's 102 internal circuitry. The power supply 104 ensures that all components, including the CPU, memory, and network interfaces, receive stable and appropriate voltage to function correctly.

The system 100 may further include a motherboard 108, also referred to as the mainboard or PCB (Printed Circuit Board), which may be the central circuit board that hosts and connects the components of the wireless router 102. This may include a central processing unit (CPU) 110, memory 111 (e.g., RAM and ROM), and/or other integrated circuits. The motherboard 108 provides the necessary electrical connections and pathways for data exchange between these components, facilitating the functions of data processing, network traffic management, and connectivity.

The CPU 110 may be configured to decode and execute any instructions stored in the memory 111 and/or received from one or more other electronic devices or server(s). The CPU 110 may include one or more general-purpose processors (e.g., INTEL® or Advanced Micro Devices® (AMD) microprocessors) and/or one or more special purpose processors, e.g., digital signal processors (DSPs) or Xilinx® System On Chip (SOC) Field Programmable Gate Array (FPGA) processor. The CPU 110 may be configured to execute one or more computer-readable program instructions to carry out any of the functions described herein. The CPU 110 may be a GPU, such as those produced by Nvidia®.

The wireless router 102 may further include an interface port 112, which may be a port that facilitates interfacing a daughterboard (as described hereafter) with the motherboard 108. The interface port 112 may be one or more ports that allow the passage of data and/or power between the motherboard 108 and daughterboard. Examples of ports may include various expansion slots (e.g., PCIe slots, PCI slots, M.2 slots), SATA connectors, USB headers, proprietary or custom connectors, GPIO headers, riser card connectors, ribbon cable connectors, NVMe connectors, U.2 connectors, mini PCIe slots, power connectors, etc. The daughterboard may connect directly to the motherboard 108, may be connected wirelessly, or may be connected with a physical connector, such as a SATA cable or USB cable.

The wireless router 102 may include a network interface 113 including one or more network interface controllers (NICs), which may be integrated, for example, into the motherboard 108. These NICs facilitate the connection of the wireless router 102 to the network by providing the necessary hardware and protocols for communication. The integration of NICs on the motherboard 108 ensures efficient data handling and connectivity. The wireless router 102 may operate the 2.4 GHz and 5 GHz bands simultaneously. The dual-band capability allows the router to manage different types of network traffic more effectively. The 2.4 GHz band, which offers broader coverage, is suitable for general internet usage and devices that are farther from the router. The 5 GHz band, which provides faster speeds but a shorter range, is ideal for high-bandwidth activities such as video streaming and gaming and for devices that are closer to the router. This dual-band operation enhances the overall performance and flexibility of the network.

The system 100 may further include a phased array device 114, which may be a device that integrates with the wireless router in order to add accurate three-dimensional device detection and tracking capabilities to the wireless router 102. The wireless router 102 and the phased array device 114 may be physically connected together within a common housing 106, which may protect the components of the wireless router 102 and the phased array device 114 from external elements. The housing 106, also known as the chassis or enclosure, may be the protective casing that encases and protects the internal components of the wireless router 102 and the phased array device 114. The housing 106 may be made from durable materials such as plastic or metal and is designed to provide both structural support and protection from physical damage, dust, and electromagnetic interference. Additionally, the housing 106 may offer features, such as ventilation to dissipate heat generated by the components and may include design elements that enhance wireless signal propagation.

The phased array device 114 may include a phased antenna array 116 including multiple individual antennas, each capable of transmitting and/or receiving electromagnetic signals. The phased array device 114 receives signals from one or more wireless devices 132 (also referred to herein as "user devices") using the phased antenna array 116 and triangulates the location of each wireless device 132 using an angle of arrival calculation based on the difference in phase and time of the received signals.

Alternatively, or in addition, the phased array antenna 116 may trilaterate the location of each wireless device 132. Trilateration uses distance measurements from at least three fixed points in 2D space or four fixed points in 3D space to calculate the coordinates of a target point. As an example, GPS uses trilateration to calculate the distance between a receiver and several satellites to determine a location. In some embodiments, the phased array antenna 116 uses triangulation, trilateration, or both triangulation and trilateration to further improve tracking accuracy.

The phased array device 114 may have active and passive functionality, which may be separate modes or may both function simultaneously. Passive functionality may refer to only receiving signals from at least a first subset of the wireless devices 132, whereas active functionality may refer to transmitting to a user device 132 in order to elicit a response from at least a second subset of the wireless devices 132. The phased array device 114 may include software and hardware components that allow the phased array device 114 to interface with the wireless router 102. The phased array device 114 and the phased antenna array 116 may be able to replicate some of the functions of the wireless router 102, such as network connection, data transmission and reception, and data storage. As such, the phased antenna array 116 is sometimes referred to herein as a "hybrid" phased antenna array owing to its dual purposes. The phased array device 114 may make use of the components of the wireless router 102, such as using the CPU 110 to execute modules, the power supply 104 to power components, the housing 106 to provide protection from the elements, or any other component of the wireless router 102. The phased array device 114 may be made from advanced materials, such as graphene or metamaterials, so as to deliver the increased sensitivity needed for certain applications.

In various embodiments, the phased array device 114 can passively listen to transmitting devices or actively ping devices to elicit a transmitted response. Passive listening has low power costs but may miss important devices that do not broadcast until pinged. Actively pinging devices will capture these devices but come at a higher power cost.

The phased antenna array 116 may be an array of antennas that receive and/or transmit at different phases. This phased antenna array 116 may include any combination of receiver antennas, transmitter antennas, and antennas capable of both receiving and transmitting signals, thereby providing versatile communication capabilities. The phased antenna array 116 may include at least one antenna capable of transmission for the active functions of the phased array device 114, such as beamforming, signal amplification, and directed communication. The phased antenna array 116 may also include at least two antennas capable of receiving for the triangulation functions of the phased array device 114. These receiving antennas facilitate precise location determination of signal sources through various techniques, such as angle of arrival (AoA) estimation. For example, the system may calculate angles from which wireless signals from a plurality of wireless devices arrive based on relative phase shifts caused by different paths the wireless signals take to reach the phased antenna array. The antennas may be arranged in a specific geometric configuration, such as linear, circular, or planar arrays, and electronically connected such that their individual signal phases and amplitudes can be controlled. This electronic control enables the phased array to dynamically steer the beam direction, enhance signal strength, and reduce interference from unwanted sources.

The phased antenna array 116 may incorporate advanced signal processing algorithms to optimize its performance. These algorithms may include adaptive beamforming, which adjusts the phase and amplitude of each antenna element to maximize signal reception from desired directions while minimizing noise and interference. The phased antenna array 116 may also support multiple-input multiple-output (MIMO) technology, allowing simultaneous transmission and reception of multiple data streams, thereby increasing the overall data throughput and reliability of the system. The phased antenna array 116 may be integrated with a control unit that monitors and adjusts the operational parameters of each antenna element in real time. This control unit may utilize feedback mechanisms to dynamically adapt to changing environmental conditions and signal propagation characteristics, ensuring optimal performance under various scenarios. The integration of these features within the phased antenna array 116 enhances the system's capability to provide robust and efficient communication and precise triangulation of signal sources. The phased antenna array 116 may include a low noise amplifier (LNA) to amplify weak incoming signals from multiple antennas while minimizing noise. The LNA may include a number of channels which each correspond to a specific antenna in the phased array, enhancing sensitivity and accuracy.

The phased array device 114 may also include a daughterboard 118, which may comprise a circuit board that connects the components of the phased array device 114 and may be integrated with (e.g., inserted into) the motherboard 108 of the wireless router 102. The daughterboard 118 transfers data and/or power from the motherboard 108 to the components of the phased array device 114 and data from the components of the phased array device 114 to the motherboard 108.

The daughterboard 118 may include a CPU 119 and a memory 120. The CPU 119 may be similar to or different from the CPU 110 of the wireless router 102. The memory 120 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions. The memory may include modules implemented as a program.

For example, the memory 120 may include a base module 122, which may be initiated when the phased array device 114 is first powered and may initiate the other modules of the phased array device 114 and pass data between the modules. The base module 122 may first initiate the interface module 124 to configure and control the interface between the wireless router 102 and phased array device 114. The base module 122 may then initiate the passive module 126 and/or active module 128 to retrieve signal data from one or more wireless devices 132. The base module 122 may then initiate the signal processing module 130 to process the received signal data in order to locate the wireless devices 132 in three-dimensional (3D) space.

Achieving centimeter-level accuracy in device tracking is useful for applications that require precise positioning and spatial awareness. The disclosed system is designed to provide this high level of precision, ensuring that positioning can be accurately determined within centimeter-level tolerances, or better, in 3D space. To enhance the capabilities of device tracking, the data obtained from the phased array device 114 can be integrated with various other device tracking technologies. For instance, synthetic aperture radar (SAR) can be utilized to offer additional spatial data, leveraging its ability to produce high-resolution images and detect changes over time. Incorporating camera-based systems can provide visual context and details that may not be captured by the phased antenna array alone. Ultrasound technology can also be employed, especially in environments where optical or radar-based systems might face challenges, such as underwater or in densely cluttered areas. Additionally, LIDAR technology can be integrated to measure distances by illuminating targets with laser light and measuring the reflection with a sensor, which is useful in applications like autonomous vehicles and topographic mapping. Combining these technologies allows for a more comprehensive device tracking process, enhancing accuracy and applicability across various fields. For example, in urban planning, combining phased array data with LIDAR can create detailed city models. In agriculture, integrating data from SAR and drones can help in precise crop monitoring and land use planning. In search and rescue operations, combining ultrasound with phased array data can assist in locating individuals in challenging environments. This approach ensures that the device tracking solution is effective in a wide range of scenarios, meeting the diverse needs of different industries and applications.

The memory 120 may further include an interface module 124, which may handle the interface of the phased array device 114 and wireless router 102. This may include initial installation and configuration of the phased array device 114 as well as ongoing operation.

The memory 120 may further include a passive module 126, which may handle the passive functions of the phased array device 114. Passive functions may refer to passively receiving signals from transmitting wireless devices 132.

The memory 120 may further include an active module 128, which may handle the active functions of the phased array device 114. Active functions may refer to transmitting a signal to wireless devices 132 in order to receive a response signal.

The memory 120 may further include a signal processing module 130, which may process the signals received by the phased antenna array 116 in order to locate the source of the signal in 3D space. The signal processing module may utilize sophisticated computational techniques, such as Kalman filters and Joint Probabilistic Data Association (JPDA) algorithms, to accurately estimate device locations and track their movements while maintaining synchronization among multiple antennas for precise triangulation. The signal processing module 130 may utilize a subnanosecond clock and a high-speed power meter for detecting the small differences in time between receiving a signal at two or more receiver antennas.

The system 100 may be configured to detect various wireless devices 132, such as a laptops, smartphones, tablets, computers, smart speakers, or any other device capable of wireless connection to the wireless router 102. Each user device 132 may include a network interface 134, such as a network interface card (NIC), which may be a hardware component that provides a computer or other user device 132 with the ability to connect to a network. The network interface 134 may provide both a standard Wi-Fi channel and a phased array asset tracking channel.

As previously discussed, the system 100 may have access to a cloud 136, which may be accessed, for example, by a wired and/or wireless network. The communication network may be implemented using various communication techniques, such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet, and relies on the sharing of resources to achieve coherence and economies of scale, like a public utility. At the same time, third-party clouds enable organizations to focus on their core businesses instead of expending resources on computer infrastructure and maintenance.

Figure 2:
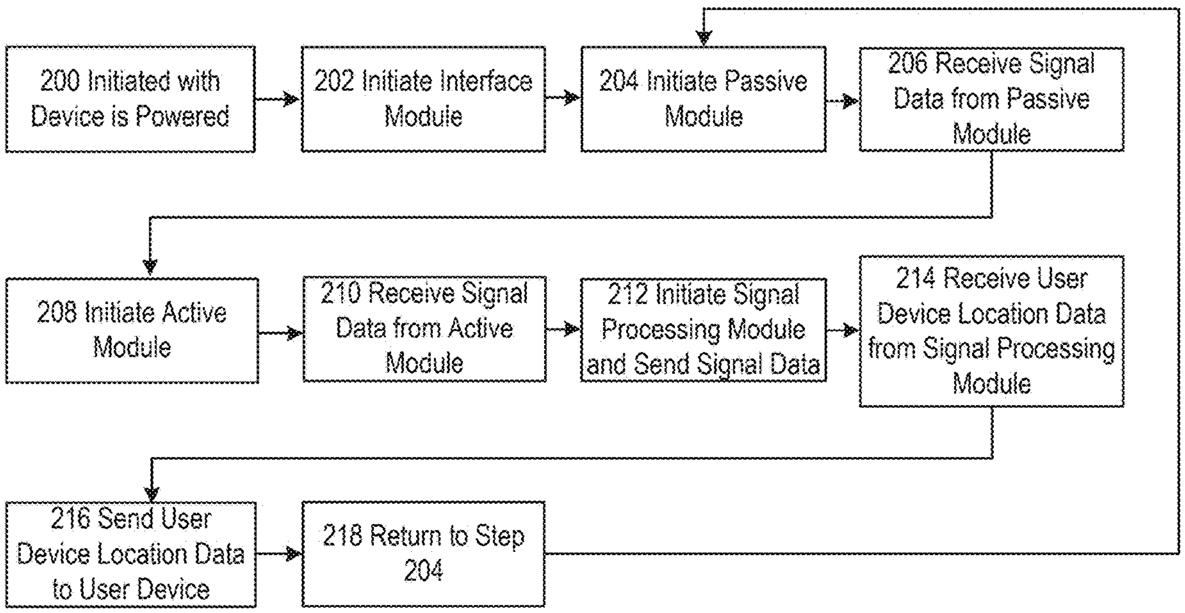
FIG. 2 is a flowchart of a method performed by a Base Module according to an embodiment.

FIG. 2 is a flowchart of a method performed by the base module 122. The base module 122 may be initiated at step 200 when the phased array device 114 receives power from the power supply 104. This may occur as soon as the daughterboard 118 interfaces with the motherboard 108 or interfaces directly with the power supply 104. The base module 122 may initiate at step 202, the interface module 124. The interface module 124 may handle the interface of the phased array device 114 and wireless router 102. This may include initial installation and configuration of the phased array device 114 as well as ongoing operation.

The base module 122 may initiate, at step 204, the passive module 126. The passive module 126 may handle the passive functions of the phased array device 114. Passive functions may refer to passively receiving signals from transmitting wireless devices 132. The base module 122 may receive, at step 206, signal data from the passive module 126. Signal data may include phase, time of reception, amplitude, frequency, and any other signal parameters for each receiving antenna in the phased antenna array 116. For example, the signal data may indicate that a 2.4 GHz signal was received at antennas 1 and 2 of the phased antenna array 116. The signal was received 3 nanoseconds later at antenna 2, and the phase was shifted by 1 radian.

The base module 122 may initiate, at step 208, the active module 128. The active module 128 may handle the active functions of the phased array device 114. Active functions may refer to transmitting a signal to wireless devices 132 in order to receive a response signal. The base module 122 may receive, at step 210, signal data from the active module 128. Signal data may include phase, time of reception, amplitude, frequency, and any other signal parameters for each receiving antenna in the phased antenna array 116. Signal data from the active module 128 may also include the signal data for the transmitted signal and any data that can be derived from both the transmitted and received signal, such as the time between the sending of the transmitted signal and the receipt of the received signal. For example, the signal data may indicate that a 2.4 GHz signal was transmitted from antenna 6 of the phased antenna array 116. After a delay of 400 nanoseconds, a response signal was received by antennas 3 and 4 of the phased antenna array 116. The signal was received 2 nanoseconds later at antenna 4, and the phase was shifted by 1 radian.

The base module 122 may initiate, at step 212, the signal processing module 130 and send in the signal data from the passive module 126 and active module 128. The signal processing module 130 may process the signals received by the phased antenna array 116 in order to locate the source of the signal in 3D space. The signal processing module 130 may utilize sophisticated computational techniques, such as Kalman filters and Joint Probabilistic Data Association (JPDA), to accurately estimate device locations and track their movements while maintaining synchronization among multiple antennas for precise triangulation. The signal processing module 130 may utilize a subnanosecond clock and a high-speed power meter for detecting the small differences in time between receiving a signal at two or more receiver antennas.

The base module 122 may receive, at step 214, user device 132 tracking data from the signal processing module 130. This tracking data may include the calculated location of each detected user device 132 based on received signals. The data may also include metadata, such as confidence level and margin of error. For example, the tracking data may include that a user's laptop is at the coordinates (1348 cm, 804 cm, −52 cm) and the user's smartphone is at the coordinates (1145 m, 210 cm, −30 cm) where the origin (0,0,0) is the location of the phased array device 114 and/or wireless router 102.

The base module 122 may send, at step 216, the user device 132 tracking data to one or more of the wireless devices 132. For example, the tracking data may be sent to the user's laptop so that the user can locate other wireless devices 132, such as a smartphone. The base module 122 may store the data locally or on the cloud 136. The base module 122 may send the data to third parties. The base module 122 may display the data via a display or user interface if one is included in the phased array device 114 or wireless router 102.

The base module 122 may return, at step 218, to step 204. The base module 122 may contiguously loop as long as the phased array device 114 is powered and/or active. In some loops, steps may be skipped to save power. For example, the active module 128 may not be initiated each loop, but, instead, once per minute.

Figure 3:
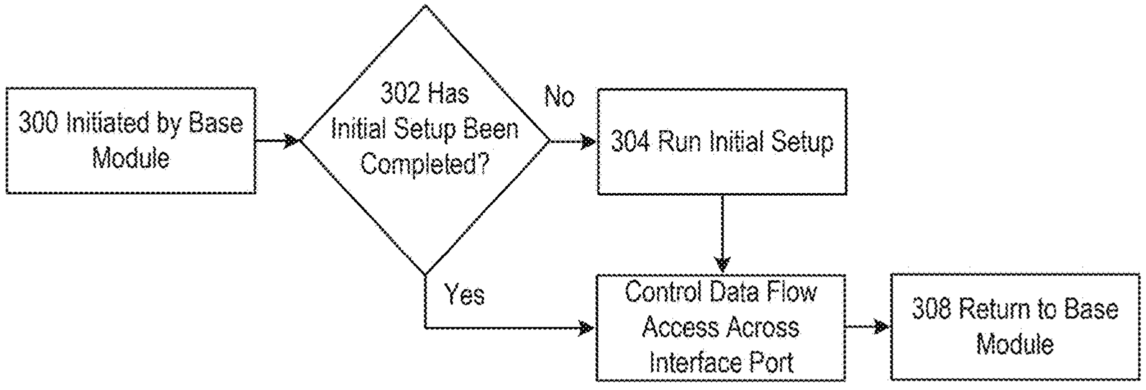
FIG. 3 is a flowchart of a method performed by an Interface Module according to an embodiment.

FIG. 3 is a flowchart of a method performed by the interface module 124. The interface module 124 may be initiated at step 300 by the base module 122. The interface module 124 may determine at step 302 if the initial setup has been completed. If this is the first time the phased array device 114 has interfaced with the wireless router 102, then the initial setup has not been completed. If this is not the first time, the interface module 124 may check if the initial setup was completed correctly by verifying the integrity of the setup files on the phased array device 114 and/or wireless router 102. If the initial setup has been completed the interface module 124 may skip to step 306.

The interface module 124 may run, at step 304, initial setup. Initial setup may include identifying the wireless router 102, selecting and installing the appropriate software drivers on the wireless router 102 and/or phased array device 114, changing the configuration settings on the wireless router 102 and/or phased array device 114, running a diagnostic check to confirm the drivers and settings are correct and working, passing test data from the wireless router 102 to the phased array device 114 and vice versa, and any other actions which may be proper for initial setup.

The interface module 124 may control, at step 306, data flow across the interface port. Controlling data flow across a port may involve multiple layers of the network stack and various mechanisms, including flow control, error detection, routing, QoS, rate limiting, security measures, and buffer management. The interface module 124 may continue to control data flow as long as the phased array device 114 is powered and/or active. The interface module 124 may return at step 308 to the base module 122 when the phased array device 114 is deactivated or powered down.

Figure 4:
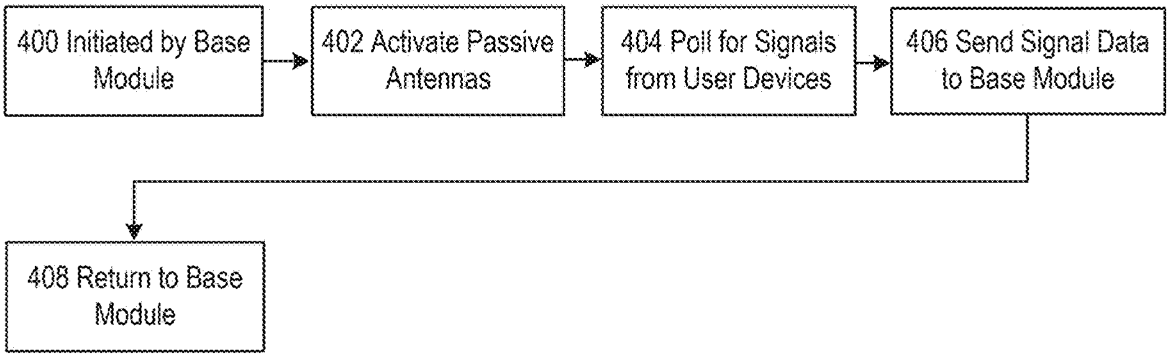
FIG. 4 is a flowchart of a method performed by a Passive Module according to an embodiment.

FIG. 4 is a flowchart of a method performed by the passive module 126. The passive module 126 may be initiated at step 400 by the base module 122. The passive module 126 may activate, at step 402, the passive antennas of the phased antenna array 116. A passive antenna may be any antenna that has no signal amplification. Passive antennas also may refer to any receiver antenna of the phased antenna array 116. For example, antennas 1 and 2 of the phased antenna array 116 may be passive.

The passive module 126 may poll at step 404 for signals from one or more wireless devices 132. Since multiple wireless devices 132 may transmit signals simultaneously, the passive module 126 may also identify each user device 132 in order to differentiate the signals. The passive module 126 may send, at step 406, signal data to the base module 122. Signal data may include phase, time of reception, amplitude, frequency, and any other signal parameters for each receiving antenna in the phased antenna array 116. For example, the signal data may indicate that a 2.4 GHz signal was received at antennas 1 and 2 of the phased antenna array 116. The signal was received 3 nanoseconds later at antenna 2, and the phase was shifted by 1 radian. The passive module 126 may return, at step 408, to the base module 122.

Figure 5:
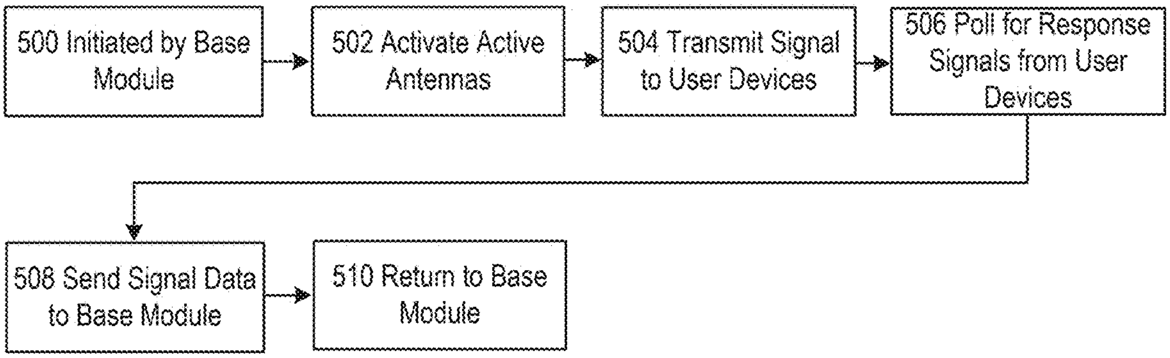
FIG. 5 is a flowchart of a method performed by an Active Module according to an embodiment.

FIG. 5 is a flowchart of a method performed by the active module 128. The active module 128 may be initiated, at step 500, by the base module 122. The active module 128 may activate, at step 502, the active antennas of the phased antenna array 116. An active antenna may be any antenna that has some signal amplification component. Active antennas also may refer to any transmitter antenna of the phased antenna array 116 and/or any receiver antenna used to receive responses following a transmitted signal. For example, antennas 3 and 4 of the phased antenna array 116 may be active receiver antennas, and antennas 5 and 6 may be active transmitter antennas.

The active module 128 may transmit, at step 504, a signal to any wireless devices 132 in range. This signal may elicit a response from one or more wireless devices 132. These may be wireless devices 132 that do not normally broadcast signals unless a signal is received first. These transmitted signals, sometimes called pings, may cause the wireless devices 132 to begin broadcasting. For example, a 2.4 GHz signal may be transmitted from antenna 6 of the phased antenna array 116. A user's phone receives the signal and responds. The response may contain data such as IP address, MAC address, device name, etc.

The active module 128 may poll, at step 506, for signals from one or more wireless devices 132. Since multiple wireless devices 132 may transmit signals simultaneously, the active module 128 may also identify each user device 132 in order to differentiate the signals. The active module 128 may send, at step 508, the signal data to the base module 122. Signal data may include phase, time of reception, amplitude, frequency, and any other signal parameters for each receiving antenna in the phased antenna array 116. Signal data from the active module 128 may also include the signal data for the transmitted signal and any data that can be derived from both the transmitted and received signal, such as the time between the sending of the transmitted signal and the receipt of the received signal. For example, the signal data may indicate that a 2.4 GHz signal was transmitted from antenna 6 of the phased antenna array 116. After a delay of 400 nanoseconds, a response signal was received by antennas 3 and 4 of the phased antenna array 116. The signal was received 2 nanoseconds later at antenna 4, and the phase was shifted by 1 radian. The active module 128 may return, at step 510, to the base module 122.

Figure 6:
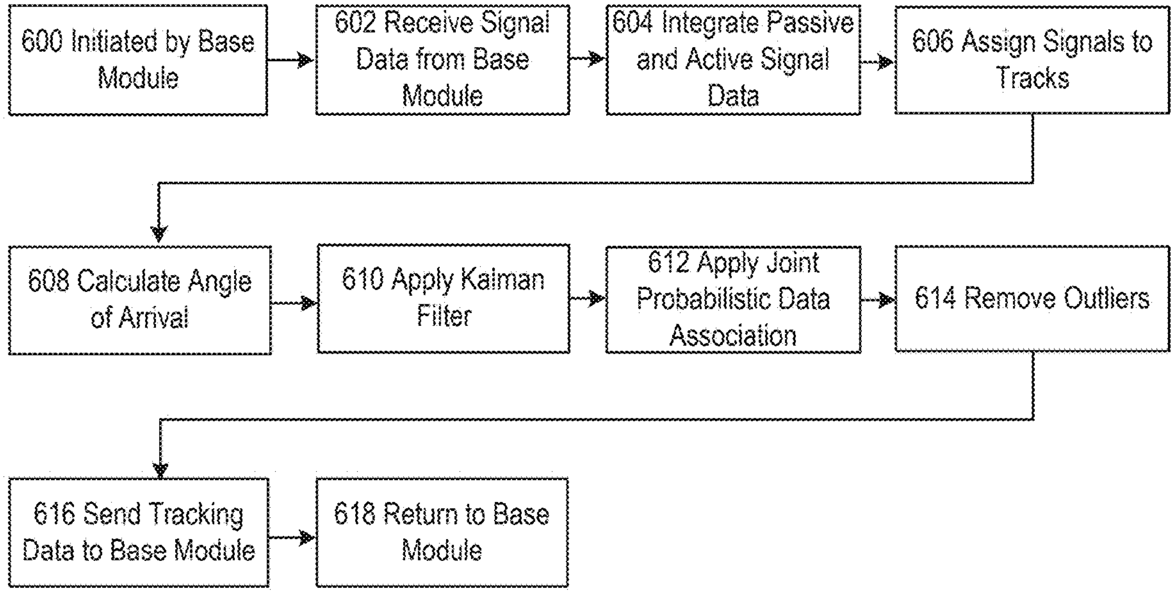
FIG. 6 is a flowchart of a method performed by a Signal Processing Module according to an embodiment.

FIG. 6 is a flowchart of a method performed by the signal processing module 130. The signal processing module 130 may be initiated, at step 600, by the base module 122. The signal processing module 130 may receive, at step 602, signal data from the base module 122. This may include the signal data from the passive module 126 and/or active module 128. For example, the signal data from the passive module 126 may indicate that a 2.4 GHz signal was received at antennas 1 and 2 of the phased antenna array 116. The signal was received 3 nanoseconds later at antenna 2, and the phase was shifted by 1 radian. The signal data from the active module 128 may indicate that a 2.4 GHz signal was transmitted from antenna 6 of the phased antenna array 116. After a delay of 400 nanoseconds, a response signal was received by antennas 3 and 4 of the phased antenna array 116. The signal was received 2 nanoseconds later at antenna 4, and the phase was shifted by 1 radian.

The signal processing module 130 may integrate, at step 604, the passive and active signal data to form a comprehensive dataset for further analysis. The integration process may also involve aligning timestamps, normalizing signal strengths, and correcting for any discrepancies between the datasets to ensure consistency and reliability of the combined data. Some wireless devices 132 may both broadcast actively and respond to pings, meaning signal data would be captured by both the passive module 126 and active module 128. The comparison of this data can give increased accuracy or may need to be purged for redundancy.

The signal processing module 130 may assign, at step 606, the signals to tracks, associating new signals with existing tracks or creating new tracks. This involves analyzing the signal data and determining which signals correspond to which tracked wireless devices 132. The signal processing module 130 may use criteria, such as signal strength, frequency, phase, identifying data, and timing information, to match signals to known tracks. If a signal does not match any existing track, a new track is created. This step is useful for organizing the signal data into coherent tracks that can be further analyzed and monitored.

The signal processing module 130 may calculate, at step 608, the angle of arrival (AoA) for each signal using phase and time delay data. This involves determining the direction from which each signal is arriving relative to the phased array. The signal processing module 130 may use the phase differences and time delays between the signals received at different antennas to calculate the AoA. This step may facilitate understanding the spatial orientation of the signal sources and is a useful in triangulating their positions. For example, the signal data from the passive module 126 indicates that a 2.4 GHz signal was received at antennas 1 and 2 of the phased antenna array 116. The signal was received 3 nanoseconds later at antenna 2, and the phase was shifted by 1 radian. Assume the antennas are 10 cm apart. The path difference ($\Delta d$) can be calculated using the time delay using the equation $\Delta d = c \times \Delta t$, where c is the speed of light in air. For a $\Delta t$ value of 3 nanoseconds, the path difference is 9 cm. The sine function of the AoA is equal to the path difference over the antenna separation, sin (AoA) $=\Delta d/d$. Evaluating this for a path distance of 9 cm gives an AoA of approximately 1.12 radians. For another example, the signal data from the active module 128 indicates that a 2.4 GHz signal was transmitted from antenna 6 of the phased antenna array 116. After a delay of 400 nanoseconds, a response signal was received by antennas 3 and 4 of the phased antenna array 116. The signal was received 2 nanoseconds later at antenna 4, and the phase was shifted by 1 radian. Assume the antennas are 10 cm apart. The phase difference ($\Delta\phi$) can be converted to path difference ($\Delta d$) using $\Delta d = (\Delta\phi \cdot \lambda)/2\pi$. Where $\lambda$ is the wavelength. Wavelength can be calculated from $(\lambda) = c/f$, where c is the speed of light and f is frequency. Since the frequency is 2.4 GHz, the wavelength is 12.5 cm. Inserting the wavelength and phase difference gives a path difference of about 2 cm. The sine function of the AoA is equal to the path difference over the antenna separation, sin (AoA)$=\Delta d/d$. Evaluating this for a path distance of 2 cm gives an AoA of approximately 0.20 radians. Using multiple methods of calculating the AoA allows the signal processing module 130 to check if all methods agree and, if not, to pick the most reliable method or approximate a value based on the answers of each method.

In addition, or alternatively, the signal processing module 130 may use the received signal strength to perform trilateration. Trilateration is an alternative method of determining the position of a signal source by calculating the distances between the source and multiple receiving antennas. Distance estimation can be performed using the AoA data, where known positions of the antennas and the angles of the incoming signal are used to infer the distance. However, a more direct and sometimes more precise method may involve deriving the distance from the difference in signal strength received at two or more antennas. The principle behind this method is based on the inverse relationship between signal strength and distance. As the distance from the signal source to the antenna increases, the signal strength decreases, typically following an inverse-square law or a similar attenuation model depending on the environment. In scenarios where trilateration is implemented, the signal processing module 130 may require at least three antennas to determine the exact location of the signal source. The use of three antennas allows the formation of three independent distance equations, which, when solved simultaneously, may provide a unique intersection point corresponding to the location of the signal source. The received signal strength at each antenna may provide the basis for calculating the respective distances. For example, if the signal at one antenna is stronger by a known percentage compared to another, the ratio of these signal strengths can be used to infer the ratio of the distances. By combining this information with the known physical separation between the antennas, the system can establish a set of nonlinear equations representing the distances from the source to each antenna. The solution involves finding the point where the calculated distances (based on signal strength differences) intersect, which represents the most likely location of the signal source relative to the antenna array. Furthermore, the accuracy of trilateration can be enhanced by incorporating additional antennas, which provide more distance measurements and, consequently, reduce the uncertainty in the position estimate. The use of more antennas allows for the implementation of overdetermined systems, where the additional data can be used to minimize errors and improve the robustness of the location estimation process. Trilateration is particularly advantageous in environments where the AoA measurement might be challenging due to multipath propagation or other interference effects that distort the apparent AoA. Tralateration may be used in place of or in conjunction with triangulation.

The signal processing module 130 may apply, at step 610, Kalman filtering to predict and update the state of tracked objects. The Kalman filter uses a series of measurements observed over time, containing statistical noise and other inaccuracies, to produce estimates of unknown variables. It operates in a two-step process: prediction and update. During the prediction step, the Kalman filter uses the current state estimate to predict the state at the next time step. During the update step, the filter incorporates new measurements to correct the state estimate. This process helps to smooth out the tracking data and provides more accurate estimates of the positions and velocities of tracked objects.

The signal processing module 130 may apply at, step 612, Joint Probabilistic Data Association (JPDA) to associate measurements with tracks probabilistically. JPDA is used in scenarios where there are multiple potential targets and measurements, and it is not clear which measurement corresponds to which target. The signal processing module 130 may calculate the probabilities of each measurement being associated with each track and update the tracks based on these probabilities. This method helps to resolve ambiguities and improves the accuracy of tracking in complex environments with multiple signal sources.

To address complex environments, a Multiple Signal Classification (MUSIC) algorithm can be used. In signal processing problems, the objective is to estimate from past measurements or expectations of measurements from a set of constant values upon which the received signals depend.

In an embodiment, in order to solve the multipath problem for high accuracy tracking, the MUSIC algorithm is used to estimate the AoA of one or more signals arriving at the antenna array. The MUSIC algorithm uses an eigenspace method to determine and express the phase shift between the antennas as a complex exponential.

$$\Phi(\theta) = e^{-j2\pi \sin(d)/\lambda}$$

$$\overrightarrow{a(\theta)} = \begin{bmatrix} 1 & \Phi(\theta) & \Phi(\theta)^2 & \dots & \Phi(\theta)^{M-1} \end{bmatrix}$$

As shown above in the equation, the phase shift of an incoming signal F(q) is determined as a function of the distance between two antennas, d, and the wavelength of the signal l. The vector a(0) represents an overall direction in which the antenna array will form a beam, wherein each element of the vector represents an individual multipath signal. For M number of antennas in the array, the vector a(q) includes M−1 processed signals. Due to the delay in transmission across the array, the vector a(q) may be used by the tracking system to steer a signal in the direction of the vector or to indicate that an incoming signal is received from the direction of the vector. The correlation matrix of an incoming signal x is given as Rxx, where eigenvectors of Rxx corresponding to its smallest eigenvalues are orthogonal to the steering vectors. Mathematically, this is done by evaluating the MUSIC spectrum according to the equation:

$$P_{MU}(\theta) = \frac{1}{\overrightarrow{\alpha}(\theta)^H E_N E_N^H \overrightarrow{\alpha}(\theta)}$$

In the above equation, H denotes the Hermitian self-adjoint matrix as a complex square matrix. EN is a matrix whose columns are the eigenvectors of Rxx corresponding eigenvalues smaller than a threshold value. Systems using the MUSIC algorithm to determine AoA for incoming signals typically need more antennas than propagation paths to resolve the incoming signals correctly. For example, the MUSIC algorithm resolves up to M−1 different signal paths (e.g., in the case of 3 antennas in the array, only 2 multipath signals can be differentiated). In one embodiment, the system overcomes the limitation of resolving M−1 signal paths by implementing multiple antennas, linked but not collocated, such that an interlinked mesh network processes signals received by the antennas as a fleet. Multiple sensors compute signal paths and the interlinked mesh network determines a true origin of the signal based on the computed paths to perform distributed spatial smoothing. Antennas may be selected or spaced for any number of multipath signals. For example, in high-frequency applications, the spacing of antenna elements can be selected based on the wavelength of multipath signals. Additionally, antennas rated for a high number of multipath signal can be larger than antennas rated for a lower number of multipath signals. In one embodiment, the antenna array includes one or more antenna with fewer antenna elements, and the interlinked mesh network is used to collect, process, and resolve data collected by the antenna array.

The signal processing module 130 may remove, at step 614, outliers to ensure the accuracy of the tracking data. Outliers are measurements that deviate significantly from the expected values and can distort the tracking results. The signal processing module 130 may use statistical analysis and predefined thresholds to identify and filter out these erroneous data points. By removing outliers, the system improves the reliability and precision of the tracking data, ensuring that accurate and consistent measurements are used in the final tracking calculations.

The signal processing module 130 may send, at step 616, the finalized tracking data to the base module 122. The tracking data may include the calculated location of each detected user device 132 based on received signals. The data may also include metadata such as confidence level and margin of error. For example, the tracking data may include that a user's laptop is at the coordinates (1348 cm, 804 cm, −52 cm) and the user's smartphone is at the coordinates (1145 m, 210 cm, −30 cm) where the origin (0,0,0) is the location of the phased array device 114 and/or wireless router 102. The signal processing module 130 may return at step 618 to the base module 122.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for device tracking, the system comprising:
- a wireless router configured to route data between a plurality of wireless devices and at least one packet switched network or subnetwork, the wireless router including a motherboard with an interface port; and
- a phased array device for wireless device tracking including:
  - a phased antenna array; and
  - a daughterboard operably connected to the phased antenna array and configured to be physically connected to the interface port of the wireless router, the daughterboard including at least one processor and a memory, the memory including:
    - at least one of a passive module configured to passively receive wireless signal data via the phased antenna array from at least a first subset of the plurality of wireless devices or an active module configured to actively receive the wireless signal data via the phased antenna array from at least a second subset of the plurality of wireless devices in response to at least one wireless signal being sent via the phased antenna array to the plurality of wireless devices; and
    - a signal processing module configured to triangulate a location of each wireless device within an environment by calculating an angle from which wireless signals from the plurality of wireless devices arrive based on relative phase shifts caused by different paths the wireless signals take to reach the phased antenna array, wherein the signal processing module triangulates the location of each wireless device in the environment simultaneously while the wireless router routes the data between the plurality of wireless devices and the at least one packet switched network or subnetwork.

2. The system of claim 1, wherein the wireless router and the phased array device are connected together physically within a common housing.

3. The system of claim 1, wherein the signal processing module is further configured to trilaterate the location of each wireless device within the environment, and wherein the signal processing module triangulates and trilaterates the location of each wireless device in the environment simultaneously while the wireless router routes the data between the plurality of wireless devices and the at least one packet switched network or subnetwork.

4. The system of claim 1, wherein the phased antenna array collaborates operations with the wireless router configured using an integration module.

5. The system of claim 1, wherein the signal processing module is further configured to use at least one of Kalman filtering, Joint Probabilistic Data Association (JPDA), and Multiple Signal Classification (MUSIC) to estimate wireless device locations.

6. The system of claim 1, wherein the phased array device is configured to send the location of one or more of the plurality of wireless devices to a user device via the wireless router.

7. The system of claim 1, wherein the memory further includes an interface module configured to control data flow between the phased array device and the wireless router via the interface port.

8. The system of claim 1, wherein the active module is configured to poll at least a subset of the plurality of wireless devices.

9. The system of claim 1, wherein the signal processing module is configured to integrate the wireless signal data from the active module and the passive module for the at least the first subset of the plurality of wireless devices and the at least the second subset of the plurality of wireless devices, respectively.

10. The system of claim 9, wherein the signal processing module is configured to integrate the wireless signal data by performing at least one of aligning timestamps, normalizing signal strengths, and correcting for discrepancies between datasets.

11. A method for device tracking, the method comprising:
- providing a wireless router configured to route data between a plurality of wireless devices and at least one packet switched network or subnetwork, the wireless router including a motherboard with an interface port;
- providing a phased array device for wireless device tracking including a phased antenna array and a daughterboard including at least one processor and a memory;
- operably connecting the daughterboard to the interface port of the wireless router;
- receiving, via the phased antenna array, wireless signal data from at least a subset of the plurality of wireless devices; and
- triangulating a location of each wireless device within an environment by calculating an angle from which wireless signals from the plurality of wireless devices arrive based on relative phase shifts caused by different paths the wireless signals take to reach the phased antenna array, wherein the location of each wireless device is triangulated simultaneously while the data is routed between the plurality of wireless devices and the at least one packet switched network or subnetwork.

12. The method of claim 11, further comprising physically connecting together the wireless router and the phased array device within a common housing.

13. The method of claim 11, further comprising trilaterating the location of each wireless device within the environment simultaneously while triangulating the location of each wireless device.

14. The method of claim 11, wherein the phased antenna array collaborates operations with the wireless router configured using an integration module.

15. The method of claim 11, further comprising performing at least one of Kalman filtering, Joint Probabilistic Data Association (JPDA), and Multiple Signal Classification (MUSIC) to estimate wireless device locations.

16. The method of claim 11, wherein the phased array device is configured to send locations of one or more of the plurality of wireless devices to a user device via the wireless router.

17. The method of claim 11, wherein receiving the wireless signal data from the at least the subset of the plurality of wireless devices includes at least one of:
passively receiving the wireless signal data from at least a first subset of the plurality of wireless devices; and
actively receiving the wireless signal data from at least a second subset of the plurality of wireless devices in response to transmitting, via the phased antenna array, at least one signal to the plurality of wireless devices.

18. The method of claim 17, wherein actively receiving comprises polling the at least the second subset of the plurality of wireless devices.

19. The method of claim 17, wherein triangulating includes integrating signal data passively or actively received from the at least the first subset of the plurality of wireless devices and the at least the second subset of the plurality of wireless devices, respectively.

20. The method of claim 19, wherein integrating includes at least one of aligning timestamps, normalizing signal strengths, and correcting for discrepancies between datasets.

21. A system for device tracking, the system comprising:
a wireless router configured to route data between a plurality of wireless devices and at least one packet switched network or subnetwork, the wireless router including a motherboard with an interface port; and
a phased array device for wireless device tracking including:
a phased antenna array; and
a daughterboard operably connected to the phased antenna array and configured to be physically connected to the interface port of the wireless router, the daughterboard including at least one processor and a memory, the memory including:
at least one of a passive module configured to passively receive wireless signal data via the phased antenna array from at least a first subset of the plurality of wireless devices or an active module configured to actively receive the wireless signal data via the phased antenna array from at least a second subset of the plurality of wireless devices in response to at least one wireless signal being sent via the phased antenna array to the plurality of wireless devices; and
a signal processing module configured to trilaterate a location of each wireless device within an environment by calculating an angle from which wireless signals from the plurality of wireless devices arrive based on relative phase shifts caused by different paths the wireless signals take to reach the phased antenna array, wherein the signal processing module trilaterates the location of each wireless device in the environment simultaneously while the wireless router routes the data between the plurality of wireless devices and the at least one packet switched network or subnetwork.

* * * * *